United States Patent
Falkus et al.

(10) Patent No.: US 12,320,263 B2
(45) Date of Patent: Jun. 3, 2025

(54) SYSTEM AND METHOD FOR USE OF INTERCOOLER COOLED FLUID AS BEARING PRESSURIZATION FLUID SOURCE

(71) Applicant: General Electric Company, Schenectady, NY (US)

(72) Inventors: Dariusz Andrzej Falkus, Warsaw (PL); Tho Vankhanh Nguyen, Cypress, TX (US); Tuy Cam Huynh, Houston, TX (US); Radu Ioan Danescu, Greer, SC (US); Richard Michael Watkins, Houston, TX (US); Mariusz Seredyn, Warsaw (PL); Kheun Chia, Houston, TX (US)

(73) Assignee: GE Infrastructure Technology LLC, Greenville, SC (US)

( * ) Notice: Subject to any disclaimer, the term of this patent is extended or adjusted under 35 U.S.C. 154(b) by 120 days.

(21) Appl. No.: 15/992,364

(22) Filed: May 30, 2018

(65) Prior Publication Data

US 2018/0347398 A1   Dec. 6, 2018

(51) Int. Cl.
*F01D 25/12* (2006.01)
*F01D 11/04* (2006.01)
(Continued)

(52) U.S. Cl.
CPC ............ *F01D 25/125* (2013.01); *F01D 11/04* (2013.01); *F02C 6/08* (2013.01); *F02C 7/143* (2013.01);
(Continued)

(58) Field of Classification Search
CPC .......... F01D 25/125; F01D 11/04; F02C 7/28; F02C 7/143; F05D 2260/98; F05D 2240/50; F05D 2260/211
See application file for complete search history.

(56) References Cited

U.S. PATENT DOCUMENTS 2,623,357 A  *  12/1952  Birmann ................. F02C 6/006
                                                    60/726
3,204,406 A  *   9/1965  Howes ...................... F02C 3/10
                                                    60/39.17
(Continued)

FOREIGN PATENT DOCUMENTS

JP    S61-188356    12/1986
JP    2016-518545    6/2016

OTHER PUBLICATIONS

Extended European Search Report and Opinion issued in connection with corresponding EP Application No. 17461542.7 dated Feb. 15, 2018.
(Continued)

*Primary Examiner* — Ted Kim
(74) *Attorney, Agent, or Firm* — Fletcher Yoder, P.C.

(57) ABSTRACT

A system includes a gas turbine engine, including a compressor, a combustor, and a turbine. The system includes an intercooler configured to receive a discharge air from the compressor and to cool the discharge air. The system includes a first conduit to divert a portion of the cooled discharge air from the intercooler or a location downstream of the intercooler to a bearing located within the turbine to pressurize the bearing to block leakage of fluid from the bearing.

20 Claims, 5 Drawing Sheets

(51) Int. Cl.
*F02C 6/08* (2006.01)
*F02C 7/143* (2006.01)
*F02C 7/28* (2006.01)
*F02C 9/18* (2006.01)

(52) U.S. Cl.
CPC .................. *F02C 7/28* (2013.01); *F02C 9/18* (2013.01); *F05D 2240/50* (2013.01); *F05D 2260/211* (2013.01); *F05D 2260/213* (2013.01); *F05D 2260/85* (2013.01); *F05D 2260/98* (2013.01)

(56) References Cited

U.S. PATENT DOCUMENTS

| | | | |
|---|---|---|---|
| 3,527,054 A | 9/1970 | Hemsworth | |
| 4,497,172 A * | 2/1985 | Smith | F16C 33/76 |
| | | | 277/412 |
| 5,317,877 A * | 6/1994 | Stuart | F02C 7/185 |
| | | | 60/736 |
| 6,134,880 A * | 10/2000 | Yoshinaka | F02C 7/143 |
| | | | 60/226.1 |
| 6,612,114 B1 * | 9/2003 | Klingels | F02C 7/18 |
| | | | 60/806 |
| 8,366,382 B1 | 2/2013 | Muldoon et al. | |
| 2005/0050898 A1 * | 3/2005 | Noda | F01D 5/081 |
| | | | 60/772 |
| 2012/0156005 A1 * | 6/2012 | Nielsen | F01D 11/02 |
| | | | 415/1 |
| 2012/0227371 A1 * | 9/2012 | Johnson | F01D 25/12 |
| | | | 60/39.83 |
| 2013/0039739 A1 * | 2/2013 | Milne | F01D 25/183 |
| | | | 415/13 |
| 2013/0174574 A1 * | 7/2013 | Heaton | F01D 11/04 |
| | | | 60/785 |
| 2013/0177406 A1 * | 7/2013 | Heaton | F01D 25/162 |
| | | | 415/176 |
| 2013/0192240 A1 * | 8/2013 | Munsell | F02C 7/185 |
| | | | 60/39.83 |
| 2013/0192251 A1 * | 8/2013 | Munsell | F01D 11/04 |
| | | | 60/785 |
| 2013/0192252 A1 | 8/2013 | Ackermann et al. | |
| 2013/0219917 A1 | 8/2013 | Suciu et al. | |
| 2014/0250898 A1 * | 9/2014 | Mackin | F02C 6/08 |
| | | | 60/772 |
| 2014/0271118 A1 * | 9/2014 | Junod | F02C 7/06 |
| | | | 415/111 |
| 2015/0300266 A1 * | 10/2015 | Glahn | F01D 11/04 |
| | | | 60/785 |
| 2016/0084111 A1 * | 3/2016 | Bei | F04D 19/002 |
| | | | 415/1 |
| 2019/0292991 A1 * | 9/2019 | Nakayama | F01D 25/145 |
| 2019/0331027 A1 * | 10/2019 | Fairman | F01D 25/125 |
| 2024/0352969 A1 * | 10/2024 | Nelson | F16C 32/048 |

OTHER PUBLICATIONS

JP Application No. 2018-101144 Office Action dated Apr. 27, 2022, and translation, 13 pgs.

* cited by examiner

SYSTEM AND METHOD FOR USE OF INTERCOOLER COOLED FLUID AS BEARING PRESSURIZATION FLUID SOURCE

BACKGROUND

The subject matter disclosed herein relates to gas turbine engines, and more specifically to, a system and method for using an intercooler to cool fluid on the engine main flow path for use as a bearing pressurization source for a bearing assembly.

Gas turbine engines generally include a compressor, a combustor, and a turbine. The gas turbine engines typically include bearing assemblies to support the rotor(s). The bearing assemblies typically are sealed around the shaft with dynamic seals.

Bearings may have sealing systems that prevent leakage of lubricating oil outside of the bearing area. If the bearings are surrounded by hot gases, the sealing system may additionally prevent ingestion of hot gases into the bearing. To seal against leakage of lubrication oil and ingestion of hot gases, clean, cool, pressurized air may be supplied adjacent to the bearing seals. The source of sealing air may be a separate external compressor or blower, or a main flow path compressor bleed. Utilizing an external source to provide the sealing air may increase the power requirements and cost because additional treatment (e.g., cooling, filtration, drying) is performed on the air before the air is delivered to the bearing(s). Using a compressor bleed as the sealing air source may complicate the compressor design since it affects the compressor operability. Thus, there is a need for an improved air source that requires less expensive equipment and/or reduced power requirements.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the claimed subject matter. Indeed, the claimed subject matter may encompass a variety of forms that may be similar to or different from the embodiments set forth below.

In a first embodiment, a system includes a gas turbine engine, including a compressor, a combustor, and a turbine. The system includes an intercooler configured to receive a discharge air from the compressor and to cool the discharge. The system includes a first conduit to divert a portion of the cooled discharge air from the intercooler or a location downstream of the intercooler to a bearing located within the turbine to pressurize the bearing to block leakage of fluid from the bearing.

In a second embodiment, a system includes a gas turbine engine, having a compressor, a combustor, and a turbine. The system includes an intercooler configured to receive a discharge air from the compressor and to cool the discharge. The system includes a first conduit configured to divert a portion of the cooled discharge air from the intercooler or a location downstream of the intercooler to a bearing located within the turbine to pressurize the bearing to block leakage of fluid from the bearing. The system includes a secondary source of air and a second conduit coupled to the secondary source and configured to receive air from the secondary source and to provide the air to the bearing to pressurize the bearing to block leakage of fluid from the bearing. The system includes a valve disposed along both the first and second conduits and a controller coupled to the valve. The controller determines whether to provide the cooled discharge air from the first conduit or the air from the second conduit to the bearing based on an operating state of the gas turbine engine.

In a third embodiment, a method includes a gas turbine engine controller, including a memory encoding one or more processor-executable routines and a processor programmed to access and execute the one or more routines encoded by the memory. The routines, when executed, cause the processor to determine whether to provide cooled discharge air from a first conduit or air from a second conduit to a bearing located within a turbine of the gas turbine engine to pressurize the bearing to block leakage of fluid from the bearing based on an operating state of the gas turbine engine. The first conduit is coupled to an intercooler or a location downstream of the intercooler and the second conduit is coupled to a secondary source of air. The routines, when executed cause the processor to control actuation of a valve disposed along both the first and conduits to provide only one of the cooled discharge air or the air to the bearing.

BRIEF DESCRIPTION OF THE DRAWINGS

These and other features, aspects, and advantages of the present claimed subject matter will become better understood when the following detailed description is read with reference to the accompanying drawings in which like characters represent like parts throughout the drawings, wherein:

DETAILED DESCRIPTION

Figure 1:
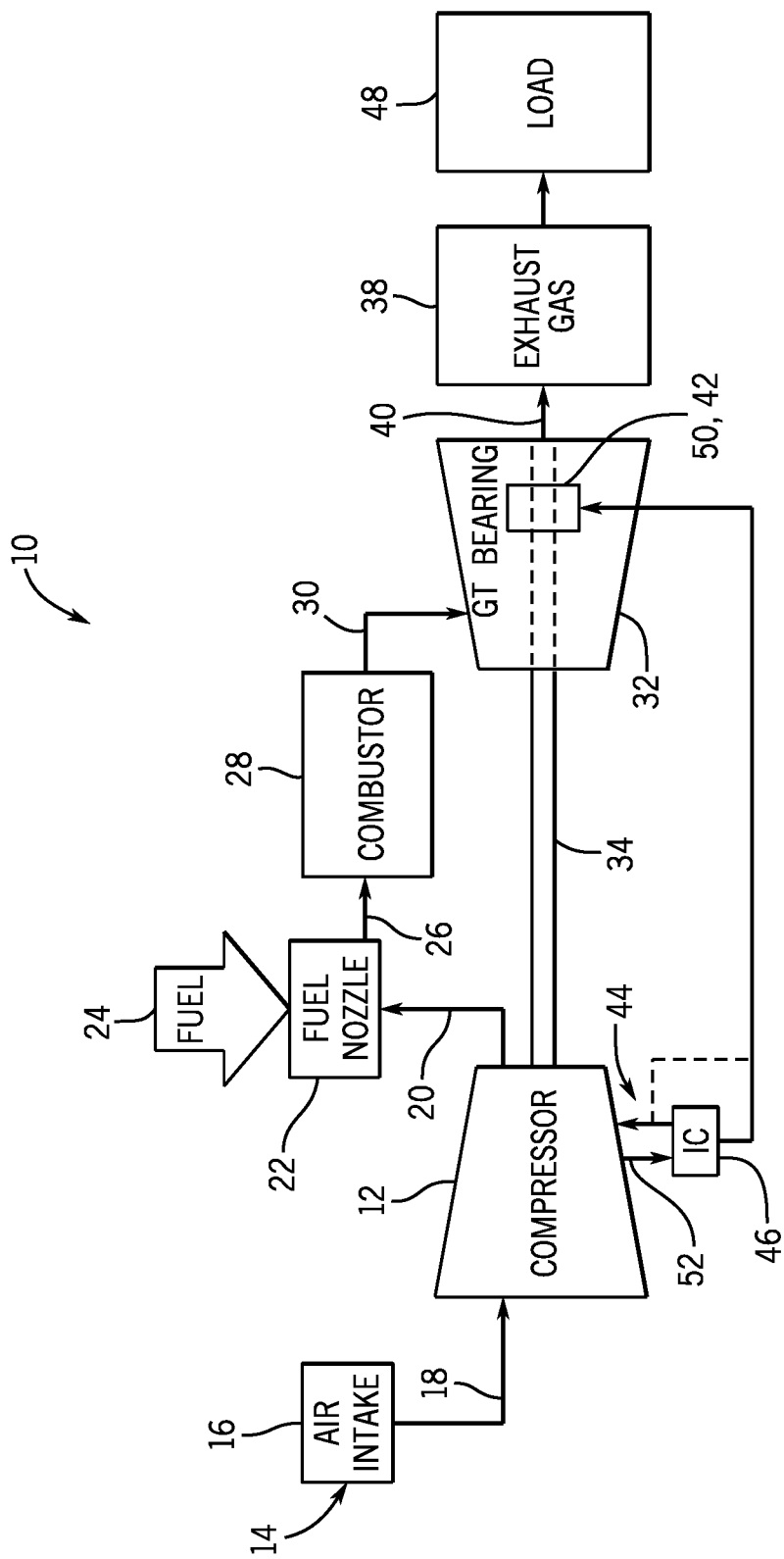
FIG. 1 is a block diagram of an embodiment of a gas turbine system and a bearing assembly utilizing intercooler cooled air.

One or more specific embodiments of the present claimed subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present claimed subject matter, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed toward providing clean, cool air that is pressurized to a bearing assembly. Utilizing the air sources in accordance with the embodiments disclosed herein avoids use of expensive instrumentation air that is conventionally used. Moreover, utilizing the air sources in accordance with the embodiments disclosed herein reduces power requirements of a gas turbine system by reducing the need for some pressurizing air equipment and accessories associated therewith. The disclosed embodiments include a first and a second source. The first air source may be utilized when the gas turbine system is in normal, operating mode (e.g., a loaded). The second air source may be utilized when the gas turbine is operating in start up mode or shut down mode. A controller is communicatively coupled to one or more control valves associated with the first air source and the second air source. The controller controls the actuation of the control valve(s) to provide air from the first air source and/or the second air source, depending at least partly on the operating state of the gas turbine system. The controller may transition between the first air source and the second air source based on engine parameters and/or input received from a user interface and/or sensors disposed throughout the system.

When the first air source is used, the air source is directed to the bearing assembly via a first conduit. The first air source includes discharge air that is discharged from a low pressure section of the compressor and cooled in an intercooler. The discharge air flows back into a high pressure section of the compressor after it is cooled. A portion of the cooled discharge air collected in a scroll is directed via a first conduit to the bearing assembly. The bearing assembly utilizes the discharge air to pressurize the bearing to reduce migration of oil from a lube oil system.

When the second air source is used, the air may be provided from a source, such as blower or a fan disposed in the gas turbine system. The second air source is utilized during start up and/or shut down of the gas turbine system. It may be appreciated the second air source may used for other purposes in gas turbine system besides sealing the bearing. The second air source is routed to the bearing assembly via a second conduit. The first and the second conduit may merge to form a common conduit that directs the cooled air to the bearing assembly. Alternatively, the first and the second conduit may be entirely separate and each direct the air (e.g., the discharge air, the blower air) to the bearing assembly. One or more control valves are designed to regulate flow of air to the bearing. The actuation of the one or more control valves may be controlled by a controller to regulate the flow of air into the bearing. The temperature of the air is cooled below a coking temperature of the oil used in the lube oil system to reduce occurrence of oil coking.

Turning now to the drawings, FIG. 1 illustrates a block diagram of an embodiment of a gas turbine system 10 receiving an air source generated by a compressor. A compressor 12 intakes ambient air 14 to the gas turbine system 10 via an air intake 16. The ambient air 14 is taken in by the air intake 16 into the gas turbine system 10 via a suitable mechanism, such as a cold air intake, for subsequent entry of an inlet air 18 into the compressor 12. The compressor 12 compresses inlet air 18, forming pressurized air 20 by rotating blades within the compressor 12. When the compressor 12 compresses the inlet air 18, the compressor 12 adds energy to the inlet air 18 thereby increasing the pressure and the temperature such that the pressurized air 20 is warmer and at a higher pressure than the ambient air 14. The pressurized air 20 may be discharged into one or more fuel nozzles 22, which mix the pressurized air 20 and a fuel 24 (e.g., a liquid fuel and/or gas fuel, such as natural gas) to produce an air-fuel mixture 26 suitable for combustion.

As depicted, the pressurized air 20 enters a fuel nozzle 22 and mixes with fuel 24. The fuel nozzle 22 directs the air-fuel mixture 26 into a combustor 28. The combustor 28 ignites and combusts the air-fuel mixture 26, to form combustion products 30. The combustion products 30 are directed to a gas turbine 32, where the combustion products 30 expand and drive blades of the gas turbine 32 about a shaft 34. The shaft 34 is supported by one or more bearing assemblies 50 disposed within the gas turbine 32.

The gas turbine 32 is connected to the compressor 12 by the common shaft 34. Compressor vanes or blades are included as components of a compressor 12. Blades within the compressor 12 are coupled to a shaft 34, which is driven by the gas turbine 32. The shaft 34 is coupled to several components (e.g., compressor 12, gas turbine 32 throughout the gas turbine system 10. Eventually, the combustion products 30 exit the gas turbine 32 as exhaust gases 38, which then exit the gas turbine system 10 via an exhaust outlet 40. In some embodiments, the exhaust gases 38 may be utilized (e.g., re-pressurized) to drive a load 48. The load 48 may include an electrical generator, a pump, other shaft driven equipment, and so forth.

As discussed herein, a bearing assembly 50 disposed downstream from the compressor 12 can utilize air sources 54 to pressurize the bearing. The system 10 may use a first air source 56 (e.g., a portion of the discharge air 52) from the compressor section once it is cooled by the intercooler 46 and directed to the bearing assembly 50 to form a seal so oil does not leak from a lube oil chamber 42. Moreover, utilizing cooled air in the bearing assembly 50 reduces migration of hot gases (e.g., a working fluid) into a lube oil chamber. The discharge air 52 from the compressor 12 may be directed from the compressor 12 through a scroll 44 (e.g., a collector) after it is cooled in an intercooler 46, or other large diameter structure, as explained further with reference to FIG. 2. In some embodiments, the air provided to the bearing 50 may be supplied from a secondary source 58.

Figure 2:
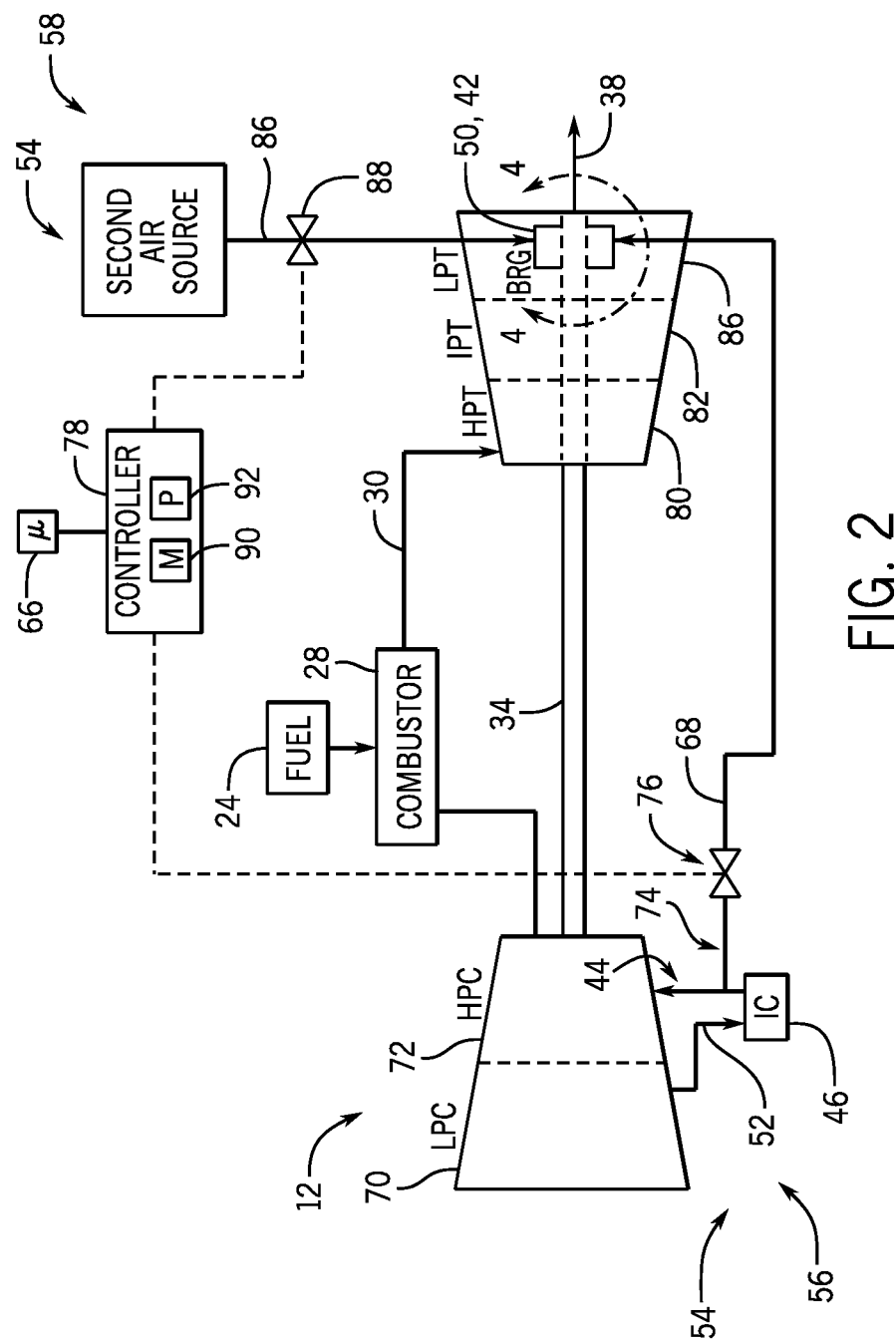
FIG. 2 is a block diagram of an embodiment of the gas turbine system depicting the air sources and a controller configured to control a fluid control valve.
Figure 3:
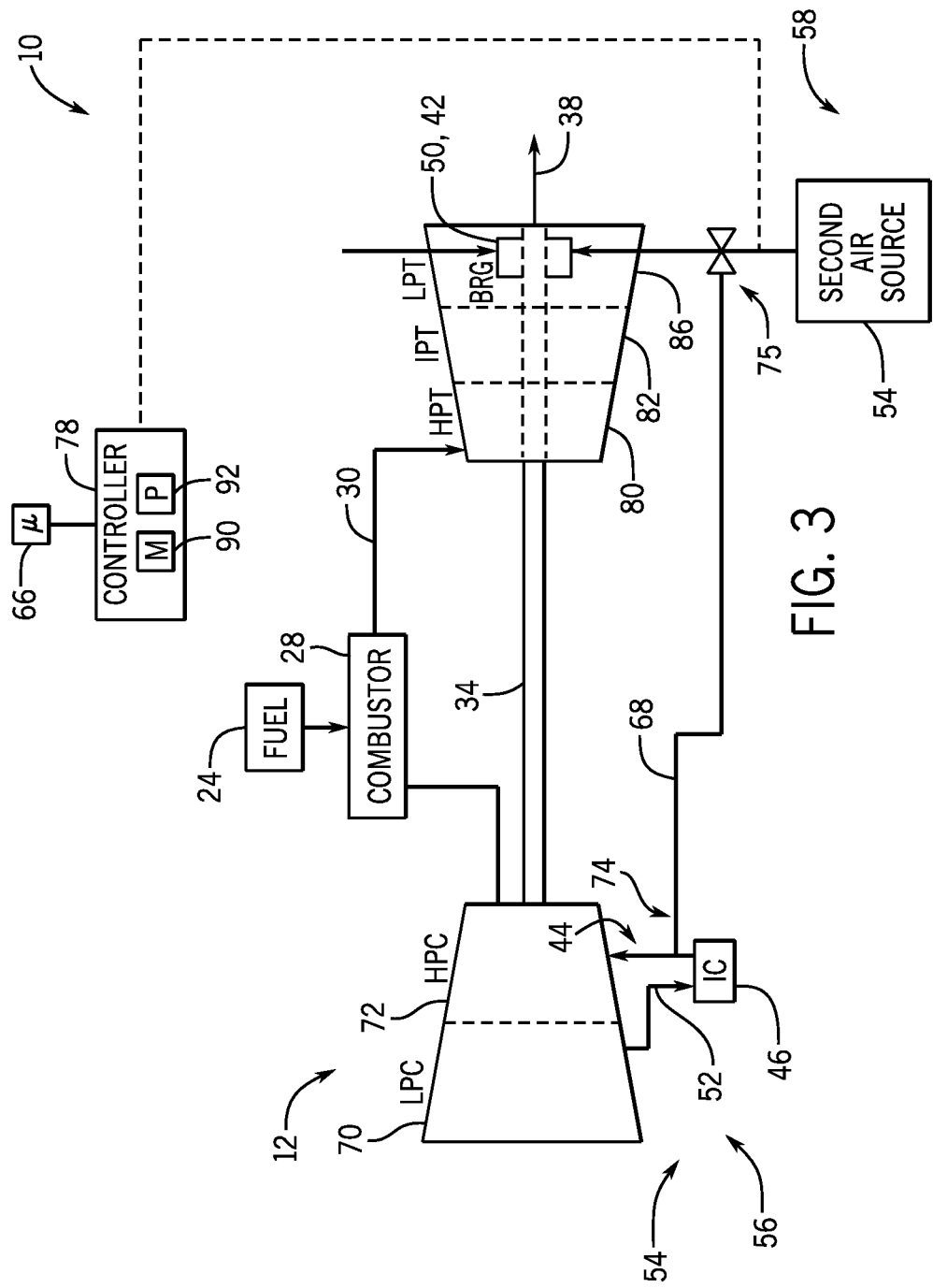
FIG. 3 is a block diagram of another embodiment of the gas turbine system depicting the air sources and a controller configured to control a fluid control valve.

FIGS. 2-3 illustrate block diagrams of embodiments of the gas turbine system 10 depicting the air sources 54 and a controller configured to control a fluid control valve. As will be appreciated, the air sources 54 that are directed to the bearing assembly 50 may be provided via the first air source 56 (e.g., from the compressor 12) or the second air source 58. The second air source 58 may include air provided by a blower, a fan, or other operating equipment utilized elsewhere in the gas turbine system 10. Whether the air is provided by the first air source 56 or the second air source 58, the temperature of the air is cooled. In some embodiments, the temperature of the air may be cooled to a temperature that is less than a temperature of a coking temperature associated with oil in a lube oil bearing chamber, as discussed further with reference to FIGS. 4-5.

The first air source 56 may be directed to the bearing assembly 50 via a first conduit 68. The first air source 56 is cooled via an intercooler 46 or other suitable cooling equipment. The intercooler 46 receives discharge air 52 from a low pressure section 70 of the compressor 12. The discharge air 52 from the low pressure section 70 of the compressor 12 is cooled in the intercooler 46 in a heat removal process. After the discharge air 52 passes through the intercooler 46, the discharge air 52 is directed back into a high pressure section 72 of the compressor 12. The cooled discharge air 52 is then further compressed before it is expelled as pressurized air 20. A portion 74 of the cooled discharge air 52 is directed from the intercooler 46 to the bearing assembly 50 via the first conduit 68. The flow of the cooled discharge air 52 is controlled via a first air valve 76 that is fluidly coupled to the first conduit 68. As explained in detail below, the first air valve 76 is communicatively coupled to a controller 78. The turbine 32 may include a high pressure turbine section 80, an intermediate pressure turbine section 82, and a low pressure turbine section 84. One or more bearing assemblies 50 may be used in turbine 32, and the first conduit 68 may be used to direct the first air source 56 to the bearing assembly 50 disposed in any of the turbine sections (e.g., low pressure 84, intermediate pressure 82, high pressure 80).

The second air source 58 may be provided from a blower, a fan, or other suitable air source in the gas turbine system 10. All or a portion of the secondary air source 58 may be directed to the bearing assembly 50 via a second conduit 86. The second conduit 86 may direct the secondary air source 58 into any section of the turbine 32. It may appreciated that the second conduit 86 may direct the second air source 58 into any bearing assembly 50 located in any of the turbine sections 80, 82. 84, as described above with reference to the first air source 56.

The second conduit 86 includes a second air valve 88 that is fluidly coupled to the second conduit 86. Though the second conduit 86 is shown separate from the first conduit 68, it may be appreciated that in some embodiments the first conduit 68 and the second conduit 86 may merge to form a single conduit and be controlled by a single valve 75, as shown in FIG. 3. The first air valve 76 and the second air valve 88 are communicatively coupled to the controller 78. Though a single controller is shown as controlling both the first air valve 76 and the second air valve 88, more than one controller may be used to control the air valves. Moreover, a controller used to control other equipment in the system 10 may be used to control the first air valve 76 and the second air valve 88.

The controller 78 includes a memory 90 and a processor 92. The controller 78 is used to actuate the first air valve 76, the second air valve 88, or a combination thereof to control the flow of the air sources 54. The controller 78 includes non-transitory code or instructions stored in a machine-readable medium (e.g., memory 90) and used by the processor (e.g., processor 92) to implement the techniques disclosed herein. In certain embodiments, the controller 78 may utilize the memory 90 to store instructions (e.g., code, routines) and the processor 92 (e.g., multiple microprocessors, one or more "general-purpose" microprocessors, one or more special-purpose microprocessors, and/or some other processor configuration) to execute the instructions or routines. The controller 78 receives one or more input signals from sensors including engine inputs, and other components (e.g., user interface 66) of the system 10. The various input signals may include engine outputs (e.g., temperature, flow rate), operating conditions, or operating modes of the system 10. The controller may utilize one or more types of control schemes based on the operating modes of the system, as explained further with reference to FIG. 4. The controller 78 is utilized to control the flow of the air sources 54 (e.g., the first air source 56, the secondary air source 58) to pressurize the bearing 50 to reduce leakage of a fluid from the bearing 50, as explained further with reference to FIG. 3.

Figure 4:
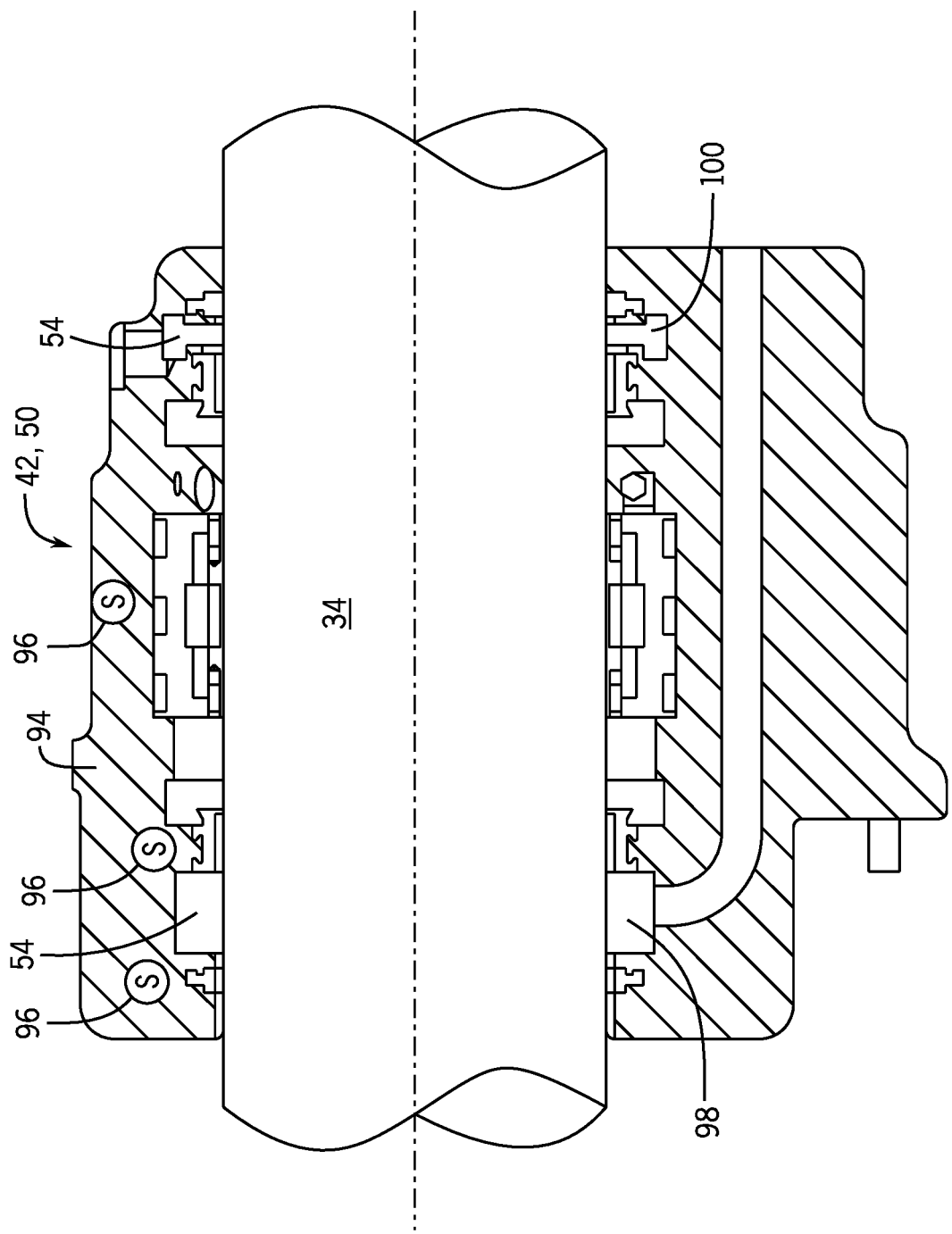
FIG. 4 is a cross sectional view of the bearing assembly taken along line 4-4 of FIG. 2.

FIG. 4 is a cross sectional view of the bearing assembly 50 taken along line 4-4 of FIG. 2. The bearing assembly 50 includes a bearing disposed within a bearing housing 94. The bearing assembly 50 includes one or more sensors 96 disposed throughout the bearing assembly 50. The sensors 96 may be configured to monitor the air temperature, the oil temperature, the air pressure, power usage, speed of rotation of rotating equipment, clearance between the rotating and stationary components, among others. The sensors 96 may output data representative of the monitored conditions. The controller 78 may receive signals from the sensors 96 to control the flow rate, temperature, and/or pressure of the air sources 54 (e.g., the first air source 56, the second air source 58).

The bearing 50 includes a forward buffer cavity 98 and a rear buffer cavity 100. The buffer cavities 98, 100 are disposed adjacent to the lube oil bearing chamber. It may be appreciated the temperature of the air sources 54 is cooled to be below a temperature which may cause oil contained in the lube oil system 42 to coke (e.g., form pressed solids). Coking may occur when the temperature of the oil is higher than the temperature at which the oil remains stable. For example, the oil may begin to coke around 190 to 250 degrees Celsius, 200 to 230 degrees Celsius, 210 to 220 degrees Celsius, and all temperatures therebetween. In this example, it is beneficial to cool the temperature of the air sources to a temperature less than 190 degrees Celsius. For example, the air sources 54 may be cooled to approximately 100 to 160 degrees Celsius, 115 to 150 degrees Celsius, 120 to 140 degrees Celsius, and all temperatures therebetween. The volumetric flow rate of the air sources 54 though the bearing assembly 50 may range from approximately 150 standard cubic feet per minute (scfm) to 400 scfm, 200 to 300 scfm, 220 to 280 scfm, and all flow rates therebetween.

The cooled air may be introduced to the forward buffer cavity 98 and/or the rear buffer cavity 100 via a line, an orifice, nozzle, or other suitable manner. Introducing the pressurized air sources 54 to the bearing 50 helps ensure the oil does not leak from the lube oil chamber 42 by forming a seal. Moreover, utilizing the air sources 54 in the bearing assembly 50 reduces migration of hot air (e.g., working fluid) into the bearing 50. The air source 54 that is utilized in the bearing assembly 50 may vary depending on the operating mode of the gas turbine system 10, as explained further with reference to FIG. 4.

Figure 5:
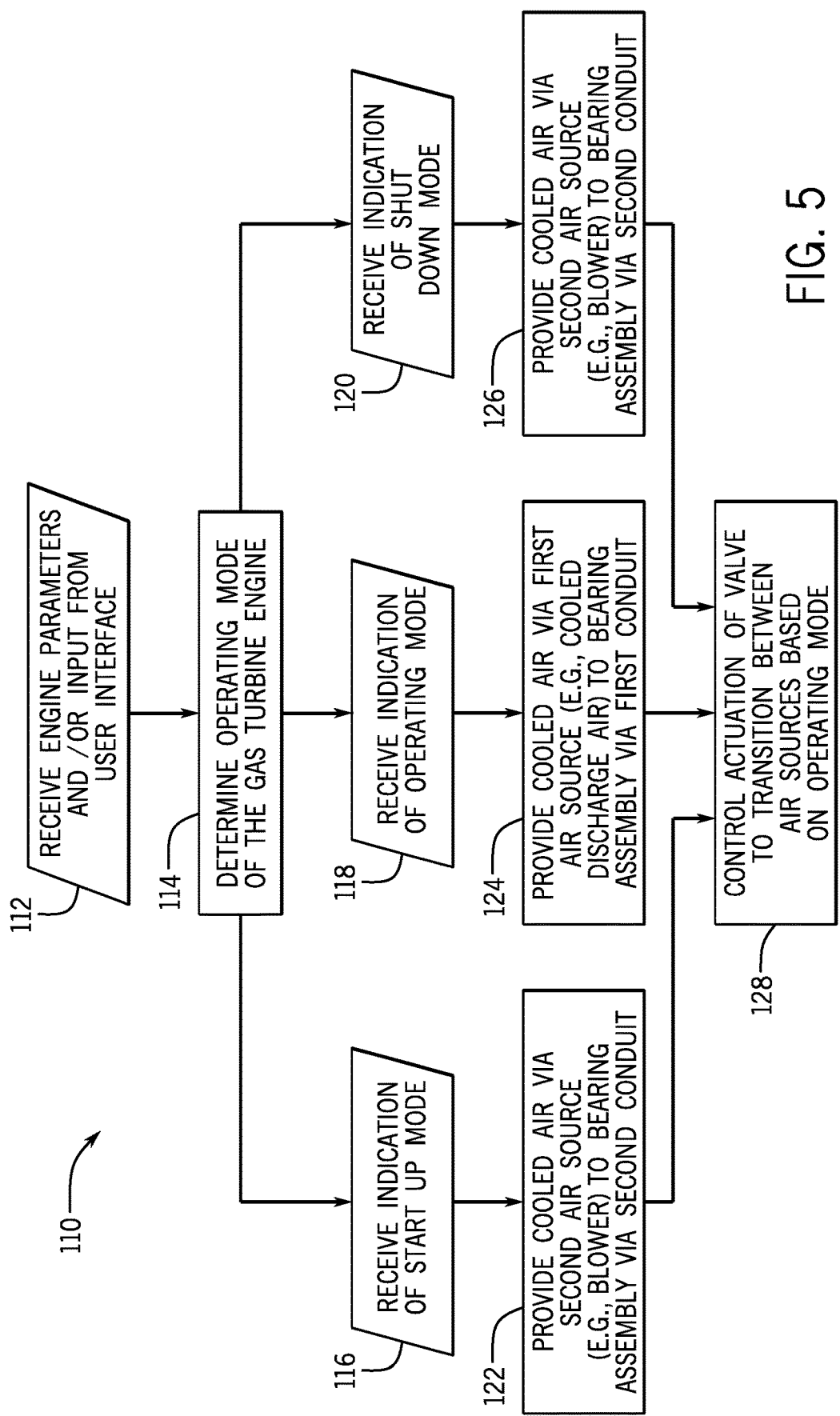
FIG. 5 is a flow chart of an embodiment of a computer-implemented method for controlling an amount of the air source based in part on an operating mode of the gas turbine system.

FIG. 5 is a flow chart of an embodiment of a computer-implemented method 110 for controlling an amount of the air source based in part on an operating mode of the gas turbine system 10. The method includes receiving (block 112) input representative of engine parameters and/or input from a user interface. The method includes utilizing the engine input to determine (block 114) the operating mode of the gas turbine engine. The method includes receiving (block 116) an indication of start up mode, receiving (block 118) an indication of an operating mode, or receiving (block 120) an indication of shut down mode. The method includes providing (block 122) cooled air via the second air source (e.g., from a blower) to the bearing assembly via the second conduit when the system 10 is operating in start up mode, when the compressor is beginning to operate. The method includes providing (block 124) cooled air via the first air source (e.g., via cooled discharge air from the compressor) to the bearing assembly when the system 10 is under operating (e.g., normal, loaded) mode. The method includes providing (block 126) cooled air via the second air source (e.g., from a blower) to the bearing assembly via the second conduit when the system 10 is operating in shut down mode. The method includes controlling (block 128) actuation of the valve to transition between the air sources (e.g., the first air source, the second air source) based on the operating mode. It may be appreciated that the first conduit and the second conduit may utilize separate control valves that are actuated to control the air flows. In other embodiments, the first and second conduit may merge and be controlled by the same valve.

Technical effects of the claimed subject matter include utilizing a first and a second air source to provide a pressurized air to a bearing assembly. The first air source may be utilized when the gas turbine system is operating in normal (e.g., loaded), operating mode. The second air source may be utilized when the gas turbine is operating in start up mode or shut down mode. The controller is communicatively coupled to one or more control valves associated with the first air source and the second air source to control actuation of the control valve(s) to provide air from the first air source and/or the second air source, depending at least partly on the operating state of the gas turbine system. The first air source is directed to the bearing assembly via a first conduit. The first air source includes discharge air that is discharged from a low pressure section of the compressor and cooled in an intercooler. The discharge air flows back into a high pressure section of the compressor after it is cooled. A portion of the cooled discharge air collected in a scroll is directed via a first conduit to the bearing assembly. The second air source is routed to the bearing assembly via a second conduit. The temperature of the air is cooled below a coking temperature of the oil used in the lube oil system to reduce occurrence of oil coking. The bearing assembly utilizes the discharge air to pressurize the bearing to reduce migration of oil from a lube oil system.

This written description uses examples to disclose the claimed subject matter, including the best mode, and also to enable any person skilled in the art to practice the claimed subject matter, including making and using any devices or systems and performing any incorporated methods. The patentable scope of the claimed subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
    a gas turbine engine, comprising:
        a compressor comprising a high pressure section and a low pressure section;
        a combustor; and
        a turbine;
    an intercooler configured to receive a discharge air from the low pressure section of the compressor, to cool the discharge air, and to return the cooled discharge air to the high pressure section of the compressor;
    a first conduit configured to divert a portion of the cooled discharge air along a first flow path from the intercooler or a location downstream of the intercooler to a bearing assembly located within the turbine to pressurize the bearing assembly to block leakage of fluid from a lube oil chamber of the bearing assembly;
    a secondary source of air, wherein the secondary source is separate from the compressor and configured to provide the air independently of the compressor;
    a second conduit coupled to the secondary source and configured to receive the air from the secondary source and to provide the air along a second flow path from the secondary source to the bearing assembly to pressurize the bearing assembly to block leakage of the fluid from the lube oil chamber, wherein the first flow path from the intercooler or the location downstream from the intercooler to the bearing assembly is independent of the second flow path from the secondary source to the bearing assembly, such that the first conduit is configured to provide the cooled discharge air to the bearing assembly independently of the air from the secondary source, and the second conduit is configured to provide the air from the secondary source to the bearing assembly independently of the cooled discharge air;
    a valve having a single inlet and a single outlet, wherein the single inlet is fluidly coupled to the second conduit and configured to receive the air from the second conduit, and the single outlet is fluidly coupled to the second conduit and configured to output the air to the second conduit; and
    a controller communicatively coupled to the valve, wherein the controller comprises a memory and a processor, and the controller is configured to control actuation of the valve to selectively provide the air from the second conduit to the bearing assembly based on an operating state of the gas turbine engine;
    wherein the controller, during startup and shutdown of the gas turbine engine, is configured to control actuation of the valve to enable the air from the secondary source to be provided to the bearing assembly, and the controller, during steady state operation of the gas turbine engine, is configured to control actuation of the valve to block the air from the secondary source from being provided to the bearing assembly.

2. The system of claim 1, comprising a further valve disposed along the first conduit.

3. The system of claim 2, wherein the further valve has a single inlet and a second outlet, the single inlet of the further valve is fluidly coupled to the first conduit and configured to receive the cooled discharge air from the first conduit, and the single outlet of the further valve is fluidly coupled to the first conduit and configured to output the cooled discharge air to the first conduit.

4. The system of claim 2, wherein the controller, during startup and shutdown of the gas turbine engine, is configured to control actuation of the further valve to block the cooled discharge air from being provided to the bearing assembly.

5. The system of claim 2, wherein the controller, during steady state operation of the gas turbine engine, is configured to control actuation of the further valve to enable the cooled discharge air to be provided to the bearing assembly.

6. The system of claim 1, wherein the secondary source comprises a blower or a fan.

7. The system of claim 1, comprising a sensor configured to be positioned at the bearing assembly, wherein the sensor is communicatively coupled to the controller, the sensor is configured to monitor, and the controller is configured to control, based on feedback from the sensor, at least one of:
    at least one of flow rate, temperature, or pressure of the cooled discharge air; or
    at least one of flow rate, temperature, or pressure of the air from the secondary source.

8. The system of claim 1, wherein the first conduit is configured to divert the portion of the cooled discharge air along the first flow path from a scroll to the bearing assembly.

9. The system of claim 1, comprising a sensor configured to be positioned at the bearing assembly, wherein the sensor is communicatively coupled to the controller, the sensor is configured to monitor clearance between rotating and stationary components, and the controller is configured to control, based on feedback from the sensor, at least one of:
- at least one of flow rate, temperature, or pressure of the cooled discharge air; or
- at least one of flow rate, temperature, or pressure of the air from the secondary source.

10. A system, comprising:
- a first conduit configured to divert a portion of a cooled discharge air along a first flow path from an intercooler or a location downstream of the intercooler to a bearing assembly located within a turbine of a gas turbine engine to pressurize the bearing assembly to block leakage of fluid from a lube oil chamber of the bearing assembly, wherein the intercooler is configured to cool discharge air from a lower pressure section of a compressor of the gas turbine engine to generate the cooled discharge air, and the intercooler is configured to provide the cooled discharge air to a high pressure section of the compressor;
- a secondary source of air, wherein the secondary source is separate from the compressor and configured to provide the air independently of the compressor;
- a second conduit coupled to the secondary source and configured to receive the air from the secondary source and to provide the air along a second flow path from the secondary source to the bearing assembly to pressurize the bearing assembly to block leakage of the fluid from the lube oil chamber, wherein the first flow path from the intercooler or the location downstream from the intercooler to the bearing assembly is independent of the second flow path from the secondary source to the bearing assembly, such that the first conduit is configured to provide the cooled discharge air to the bearing assembly independently of the air from the secondary source, and the second conduit is configured to provide the air from the secondary source to the bearing assembly independently of the cooled discharge air;
- a valve having a single inlet and a single outlet, wherein the single inlet is fluidly coupled to the second conduit and configured to receive the air from the second conduit, and the single outlet is fluidly coupled to the second conduit and configured to output the air to the second conduit; and
- a controller communicatively coupled to the valve, wherein the controller comprises a memory and a processor, and the controller is configured to control actuation of the valve to selectively provide the air from the second conduit to the bearing assembly based on an operating state of the gas turbine engine;
- wherein the controller, during startup and shutdown of the gas turbine engine, is configured to control actuation of the valve to enable the air from the secondary source to be provided to the bearing assembly, and the controller, during steady state operation of the gas turbine engine, is configured to control actuation of the valve to block the air from the secondary source from being provided to the bearing assembly.

11. The system of claim 10, comprising a further valve disposed along the first conduit.

12. The system of claim 11, wherein the further valve has a single inlet and a second outlet, the single inlet of the further valve is fluidly coupled to the first conduit and configured to receive the cooled discharge air from the first conduit, and the single outlet of the further valve is fluidly coupled to the first conduit and configured to output the cooled discharge air to the first conduit.

13. The system of claim 11, wherein the controller, during startup and shutdown of the gas turbine engine, is configured to control actuation of the further valve to block the cooled discharge air from being provided to the bearing assembly.

14. The system of claim 11, wherein the controller, during steady state operation of the gas turbine engine, is configured to control actuation of the further valve to enable the cooled discharge air to be provided to the bearing assembly.

15. The system of claim 10, wherein the secondary source comprises a blower or a fan.

16. The system of claim 10, comprising a sensor configured to be positioned at the bearing assembly, wherein the sensor is communicatively coupled to the controller, the sensor is configured to monitor, and the controller is configured to control, based on feedback from the sensor, at least one of:
- at least one of flow rate, temperature, or pressure of the cooled discharge air; or
- at least one of flow rate, temperature, or pressure of the air from the secondary source.

17. The system of claim 10, wherein the first conduit is configured to divert the portion of the cooled discharge air along the first flow path from a scroll to the bearing assembly.

18. The system of claim 10, wherein the first conduit is configured to provide the cooled discharge air to a forward buffer cavity of the bearing assembly and to a rear buffer cavity of the bearing assembly, and the second conduit is configured to provide the air from the secondary source to the forward buffer cavity of the bearing assembly and to the rear buffer cavity of the bearing assembly.

19. The system of claim 10, comprising a sensor configured to be positioned at the bearing assembly, wherein the sensor is communicatively coupled to the controller, the sensor is configured to monitor clearance between rotating and stationary components, and the controller is configured to control, based on feedback from the sensor, at least one of:
- at least one of flow rate, temperature, or pressure of the cooled discharge air; or
- at least one of flow rate, temperature, or pressure of the air from the secondary source.

20. A system, comprising:
- a gas turbine engine configured to drive a generator, comprising:
  - a compressor comprising a high pressure section and a low pressure section;
  - a combustor; and
  - a turbine;
- an intercooler configured to receive a discharge air from the low pressure section of the compressor, to cool the discharge air, and to return the cooled discharge air to the high pressure section of the compressor;
- a first conduit configured to divert a portion of the cooled discharge air along a first flow path from the intercooler or a location downstream of the intercooler to a bearing assembly located within the turbine to pressurize the bearing assembly to block leakage of fluid from a lube oil chamber of the bearing assembly;
- a secondary source of air, wherein the secondary source is separate from the compressor and configured to provide the air independently of the compressor;
- a second conduit coupled to the secondary source and configured to receive the air from the secondary source and to provide the air along a second flow path from the secondary source to the bearing assembly to pressurize the bearing assembly to block leakage of the fluid from the lube oil chamber, wherein the first flow path from the intercooler or the location downstream from the intercooler to the bearing assembly is independent of the second flow path from the secondary source to the bearing assembly, such that the first conduit is configured to provide the cooled discharge air to the bearing assembly independently of the air from the secondary source, and the second conduit is configured to provide the air from the secondary source to the bearing assembly independently of the cooled discharge air;

a valve having a single inlet and a single outlet, wherein the single inlet is fluidly coupled to the second conduit and configured to receive the air from the second conduit, and the single outlet is fluidly coupled to the second conduit and configured to output the air to the second conduit; and a controller communicatively coupled to the valve, wherein the controller comprises a memory and a processor, and the controller is configured to control actuation of the valve to selectively provide the air from the second conduit to the bearing assembly based on an operating state of the gas turbine engine;

wherein the controller, during startup and shutdown of the gas turbine engine, is configured to control actuation of the valve to enable the air from the secondary source to be provided to the bearing assembly, and the controller, during steady state operation of the gas turbine engine, is configured to control actuation of the valve to block the air from the secondary source from being provided to the bearing assembly.

* * * * *